(12) United States Patent
Larson et al.

(10) Patent No.: US 9,389,940 B2
(45) Date of Patent: Jul. 12, 2016

(54) SYSTEM AND METHOD FOR ERROR LOGGING

(71) Applicant: Silicon Graphics International Corp., Fremont, CA (US)

(72) Inventors: Mark Larson, Bloomer, WI (US); Michael Brown, Eau Claire, WI (US); Gary Meyer, Eau Claire, WI (US)

(73) Assignee: Silicon Graphics International Corp., Milpitas, CA (US)

( * ) Notice: Subject to any disclaimer, the term of this patent is extended or adjusted under 35 U.S.C. 154(b) by 359 days.

(21) Appl. No.: 13/780,248

(22) Filed: Feb. 28, 2013

(65) Prior Publication Data

US 2014/0245079 A1     Aug. 28, 2014

(51) Int. Cl.
  *G06F 11/00* (2006.01)
  *G06F 11/07* (2006.01)

(52) U.S. Cl.
  CPC ........ *G06F 11/0772* (2013.01); *G06F 11/0724* (2013.01)

(58) Field of Classification Search
  CPC ............ G06F 11/0766; G06F 11/0772; G06F 11/0787; G06F 11/22; G06F 11/0724; G06F 11/2242; G06F 11/0709; G06F 11/0712
  USPC ....................................... 714/30, 36
  See application file for complete search history.

(56) References Cited

U.S. PATENT DOCUMENTS

| | | | |
|---|---|---|---|
| 4,897,840 A * | 1/1990 | Weiss et al. ................... 714/765 |
| 5,033,047 A * | 7/1991 | Uehara .......................... 714/4.1 |
| 6,175,931 B1 * | 1/2001 | Hornung ........................ 714/4.4 |
| 6,263,373 B1 * | 7/2001 | Cromer et al. ................. 709/250 |
| 6,615,374 B1 * | 9/2003 | Moran ............................ 714/48 |
| 6,874,052 B1 * | 3/2005 | Delmonico .................... 710/305 |
| 8,122,285 B2 * | 2/2012 | Yagi ..................... G06F 11/1441 370/242 |
| 2004/0078732 A1 * | 4/2004 | Meaney ........................ 714/57 |
| 2004/0139374 A1 * | 7/2004 | Meaney et al. ................. 714/48 |
| 2004/0205420 A1 * | 10/2004 | Seeley et al. .................... 714/57 |
| 2004/0267999 A1 * | 12/2004 | Larson et al. ................. 710/301 |
| 2006/0020851 A1 * | 1/2006 | Takahashi et al. .............. 714/11 |
| 2006/0190674 A1 * | 8/2006 | Poechmueller ............... 711/103 |
| 2008/0126830 A1 * | 5/2008 | Balazich et al. .................. 714/2 |
| 2008/0178048 A1 * | 7/2008 | Balazich et al. ................. 714/48 |
| 2009/0150728 A1 * | 6/2009 | Barlow et al. ................. 714/718 |
| 2010/0122116 A1 * | 5/2010 | Floyd et al. ..................... 714/30 |
| 2010/0318751 A1 * | 12/2010 | Andreasen ..................... 711/154 |
| 2011/0138219 A1 * | 6/2011 | Walton ................ G06F 11/0712 714/3 |
| 2011/0296256 A1 * | 12/2011 | Watkins et al. ................. 714/54 |

(Continued)

FOREIGN PATENT DOCUMENTS

| | | | | |
|---|---|---|---|---|
| WO | WO 2005008495 A2 * | 1/2005 | | |
| WO | WO 2011071490 A1 * | 6/2011 | .......... G06F 11/0712 |

*Primary Examiner* — Joseph Kudirka

(74) *Attorney, Agent, or Firm* — Sunstein Kann Murphy & Timbers LLP

(57) ABSTRACT

Error data is read from error registers and written into a buffer. A computing node uses a BIOS to read the error data, rearm the error register and write the data into a memory mapped buffer. A hub chip supports creation of a shared memory system of computing nodes. A management controller in the computing node extracts error data from the buffer. The error data preferably consists essentially of the error register identifiers and the contents of the error registers. A system management node receives the error data from the management controllers in the computing nodes. The system management node may be coupled to but separate from the computing nodes.

18 Claims, 5 Drawing Sheets

(56) References Cited

U.S. PATENT DOCUMENTS

| | | | |
|---|---|---|---|
| 2012/0151263 A1* | 6/2012 | Rentschler et al. | 714/30 |
| 2013/0151909 A1* | 6/2013 | Kikuchi | 714/54 |
| 2013/0219229 A1* | 8/2013 | Sugimoto | G06F 11/0724 714/45 |
| 2014/0189441 A1* | 7/2014 | Ishida et al. | 714/47.3 |
| 2014/0359044 A1* | 12/2014 | Davis et al. | 709/213 |

\* cited by examiner

SYSTEM AND METHOD FOR ERROR LOGGING

FIELD OF THE INVENTION

The invention generally relates to field replaceable unit analysis and error logging and, more particularly, the invention relates to error logging in performance-critical computing systems.

BACKGROUND OF THE INVENTION

When a computer system fails or crashes, valuable computing time can be lost while awaiting repair or replacement. Unfortunately, it may take an extended time to identify the faulty component. This is particularly true for a large computer system, especially one in which a computing partition spans components in different chassis. A technician may need to analyze error data on many of the different components.

Typically, errors are detected and logged by software running on the operating system of the affected computer. This additional load on the operating system is intrusive on performance-critical systems. It is undesirable to be slowing computer performance simply in order to recover more quickly from a rare hardware failure.

SUMMARY OF VARIOUS EMBODIMENTS

In accordance with one aspect of the invention, a computing system includes a plurality of computing nodes each having a BIOS ("Basic Input/Output System"), at least one error register and at least one processor. The BIOS of each computing node is configured to instruct the at least one processor to read error data from the at least one error register and write the error data into a buffer in the computing node. In specific embodiments, the buffer is a memory mapped buffer, and more specifically, a buffer in synchronous dynamic random-access memory "SDRAM" and still more specifically, a ring buffer. A management controller at each computing node is configured to extract error data from the buffer. A system management node is configured to receive the error data from each of the management controllers, thereby permitting error analysis to be conducted on an extensive history of logged data without regard to the current condition of the computing nodes.

The computing system may span a plurality of chassis each containing at least two of the computing nodes. A chassis controller in each chassis is in communication with the management controllers in each of the computing nodes in the chassis. As such, error data passes from the management controllers through the chassis controllers to the system management node.

In accordance with a further aspect of the invention, a computing node includes at least one processor having a BIOS and an operating system, a plurality of error registers and a memory mapped buffer. The BIOS is configured to instruct the at least one processor to read error data from at least one of the plurality of error registers and write the error data into the memory mapped buffer. In specific embodiments, the error data consists essentially of error register identifiers and the contents of the error registers. A management controller extracts error data from the memory mapped buffer. The management controller may act responsively to an interrupt generated by a programmed gate array when error data is written into the memory mapped buffer. A hub chip supports access to shared memory with other computing nodes. One or more of the error registers may be located on the hub chip.

With regard to methods of the invention, errors are logged in a hardware architecture operating a plurality of physically separate computing nodes. One approach to logging errors responds to an error interrupt generated within one of the computing nodes. Error registers are read and the error data from the error registers is written to a memory mapped buffer within the computing node. The error data is sent from the buffer to a repository accessible to an error analyzer in the hardware architecture coupled to but separate from the plurality of computing nodes. The error data has thus been collected for analysis outside of the computing nodes. An error analyzer analyzes at least some of the error data to determine which component in the hardware architecture needs to be repaired or replaced.

To facilitate capturing more error data information, the error registers are rearmed after they have been read. Specifically, the BIOS is used to more rapidly rearm the registers. When the memory mapped buffer is full, in one embodiment error data to be written is discarded so as not to slow the error collection process. Embodiments of the present invention are particularly well suited for use in high performance computing systems.

In a shared memory architecture, computing nodes treat memory throughout a partition as its own, even when located in different nodes. A method for booting up a computing node in a shared memory architecture of computing nodes is one embodiment of the present invention. The boot up process includes allocating an area in local memory of the computing node for maintaining local hardware configuration information, such that error logging can be limited to the local node. A buffer is memory mapped and a controller in the computing node is informed of the location of the buffer. Error handler code is copied into the local memory. The error handler code includes instructions to read an error register and to write error data from the error register to the buffer. The error handler code may further include instruction to rearm the error register after it has been read. Interrupt hardware is configured to trigger running of the error handler code.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

Embodiments of the invention are described herein for particularly advantageous use in conjunction with a HPC.

Nevertheless, clusters or other hardware architectures that include physically separate components may also make use of various embodiments of the invention. Therefore, unless otherwise specified, the invention is not limited to a HPC. As used herein, "physically separate" components are defined as not being housed in the same chassis.

HPC System Architecture

Figure 1:
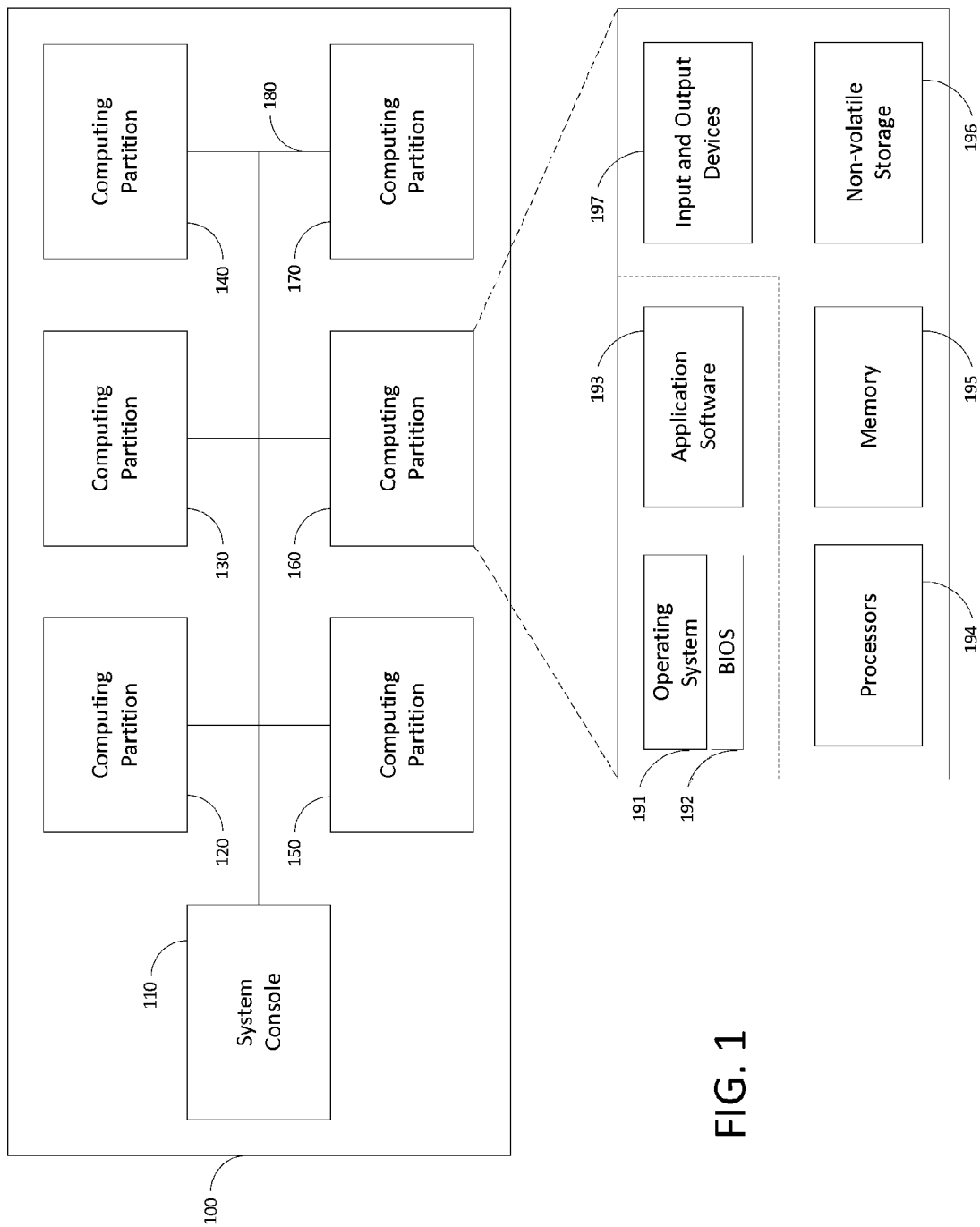
FIG. 1 schematically shows a logical view of a high performance computing ("HPC") system that may incorporate embodiments of the present invention.

A particular computer hardware environment in which embodiments of the invention may be advantageously implemented shall now be described. FIG. 1 schematically shows a logical view of an exemplary high-performance computing system 100. Specifically, as known by those in the art, a "high-performance computing system," or "HPC system," is a computing system having a plurality of modular computing resources that are tightly coupled using hardware interconnects, so that processors may access remote data directly using a common memory address space.

The HPC system 100 includes a number of logical computing partitions 120, 130, 140, 150, 160, 170 for providing computational resources, and a system console 110 for managing the plurality of partitions 120-170. A "computing partition" (or "partition") in an HPC system is an administrative allocation of computational resources that runs a single operating system instance and has a common memory address space. Partitions 120-170 may communicate with the system console 110 using a logical communication network 180. A system user, such as a scientist or engineer who desires to perform a calculation, may request computational resources from a system operator, who uses the system console 110 to allocate and manage those resources. The HPC system 100 may have any number of computing partitions that get administratively assigned, and often has only one partition that encompasses all of the available computing resources. Accordingly, this figure should not be seen as limiting the definition of HPC.

Each computing partition, such as partition 160, may be viewed logically as if it were a single computing device, akin to a desktop computer. Thus, the partition 160 may execute software, including a single operating system ("OS") instance 191 that uses a basic input/output system ("BIOS") 192 as these are used together in the art, and application software 193 for one or more system users.

Accordingly, as also shown in FIG. 1, a computing partition has various hardware allocated to it by a system operator, including one or more processors 194, volatile memory 195, non-volatile storage 196, and input and output ("I/O") devices 197 (e.g., network ports, video display devices, keyboards, and the like). However, in HPC systems like the embodiment in FIG. 1, each computing partition has a great deal more processing power and memory than a typical desktop computer. The OS software may include, for example, a Windows® operating system by Microsoft Corporation of Redmond, Wash., or a Linux operating system. The BIOS may include firmware provided by a hardware manufacturer, such as Intel Corporation of Santa Clara, Calif., customized to fulfill the requirements for a BIOS of a partition in an HPC system.

As part of its system management role, the system console 110 acts as an interface between the computing capabilities of the computing partitions 120-170 and the system operator or other computing systems. To that end, the system console 110 issues commands to the HPC system hardware and software on behalf of the system operator that permit, among other things: 1) booting the hardware, 2) dividing the system computing resources into computing partitions, 3) initializing the partitions, 4) monitoring the health of each partition and any hardware or software errors generated therein, 5) distributing operating systems and application software to the various partitions, 6) causing the operating systems and software to execute, 7) backing up the state of the partition or software therein, 8) shutting down application software, and 9) shutting down a computing partition or the entire HPC system 100. These particular functions are described in more detail in the section below entitled "System Operation."

Figure 2:
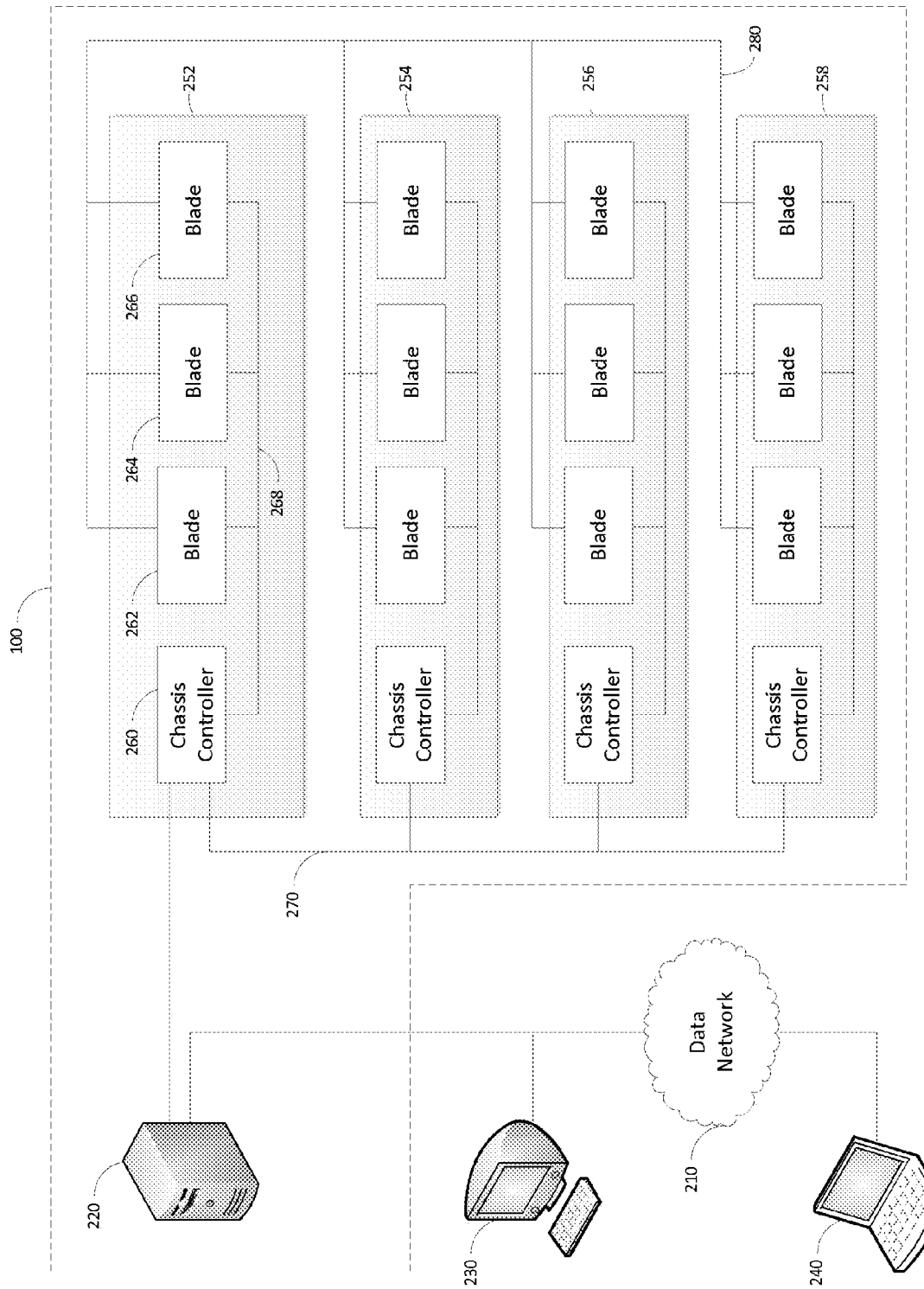
FIG. 2 schematically shows a physical view of the HPC system of FIG. 1.

FIG. 2 schematically shows a physical view of a high performance computing system 100 in accordance with the embodiment of FIG. 1. The hardware that comprises the HPC system 100 of FIG. 1 is surrounded by the dashed line. The HPC system 100 is connected to a customer data network 210 to facilitate customer access.

The HPC system 100 includes a system management node ("SMN") 220 that performs the functions of the system console 110. The management node 220 may be implemented as a desktop computer, a server computer, or other similar computing device, provided either by the customer or the HPC system designer, and includes software necessary to control the HPC system 100 (i.e., the system console software).

The HPC system 100 is accessible using the data network 210, which may be inclusive of any data network known in the art, such as a customer local area network ("LAN"), a virtual private network ("VPN"), the Internet, or a combination of these networks, or the like. Any of these networks may permit a number of users to access the HPC system resources remotely and/or simultaneously. For example, the management node 220 may be accessed by a customer computer 230 by way of remote login using tools known in the art such as Windows® Remote Desktop Services or the Unix secure shell. If the customer is so inclined, access to the HPC system 100 may be provided to a remote computer 240. The remote computer 240 may access the HPC system by way of a login to the management node 220 as just described, or using a gateway or proxy system as is known to persons in the art.

The hardware computing resources of the HPC system 100 (e.g., the processors, memory, non-volatile storage, and I/O devices shown in FIG. 1) are provided collectively by one or more "blade chassis," such as blade chassis 252, 254, 256, 258 shown in FIG. 2, that are managed and allocated into computing partitions. A blade chassis is an electronic chassis that is configured to house, power, and provide high-speed data communications between a plurality of stackable, modular electronic circuit boards called "blades." Each blade includes enough computing hardware to act as a standalone computing server. The modular design of a blade chassis permits the blades to be connected to power and data lines with a minimum of cabling and vertical space.

Accordingly, each blade chassis, for example blade chassis 252, has a chassis management controller 260 (also referred to as a "chassis controller" or "CMC") for managing system functions in the blade chassis 252, and a number of blades 262, 264, 266 for providing computing resources. Each blade, for example blade 262, contributes its hardware computing resources to the collective total resources of the HPC system 100. The system management node 220 manages the hardware computing resources of the entire HPC system 100 using the chassis controllers, such as chassis controller 260, while each chassis controller in turn manages the resources for just the blades in its blade chassis. The chassis controller 260 is physically and electrically coupled to the blades 262-266 inside the blade chassis 252 by means of a local management bus 268. The hardware in the other blade chassis 254-258 is similarly configured.

The chassis controllers communicate with each other using a management connection 270. The management connection 270 may be a high-speed LAN, for example, running an Ethernet communication protocol, or other data bus. By contrast, the blades communicate with each other using a computing connection 280 established by the hub chips (ASIC 340) in the blades. In particular, the computing connection 280 supports a shared memory system, such as a non-uniform memory access ("NUMA") system. To that end, the computing connection 280 illustratively may implement a high-bandwidth, low-latency system interconnect, such as NumaLink, developed by Silicon Graphics International Corp. of Fremont, Calif.

The chassis controller 260 provides system hardware management functions to the rest of the HPC system. For example, the chassis controller 260 may receive a system boot command from the SMN 220, and respond by issuing boot commands to each of the blades 262-266 using the local management bus 268. In some embodiments, such as that shown in FIG. 2, the SMN 220 or a customer computer 230 are provided access to a single, master chassis controller 260 that processes system management commands to control the HPC system 100 and forwards these commands to the other chassis controllers. In other embodiments, however, an SMN 220 is coupled directly to the management connection 270 and issues commands to each chassis controller individually. Persons having ordinary skill in the art may contemplate variations of these designs that permit the same type of functionality, but for clarity only these designs are presented.

While FIG. 2 shows an HPC system 100 having four chassis and three blades in each chassis, it should be appreciated that an HPC can be configured in a wide variety of sizes. An HPC system may have dozens of chassis and hundreds of blades; indeed, HPC systems often are desired because they provide very large quantities of tightly-coupled computing resources.

Figure 3:
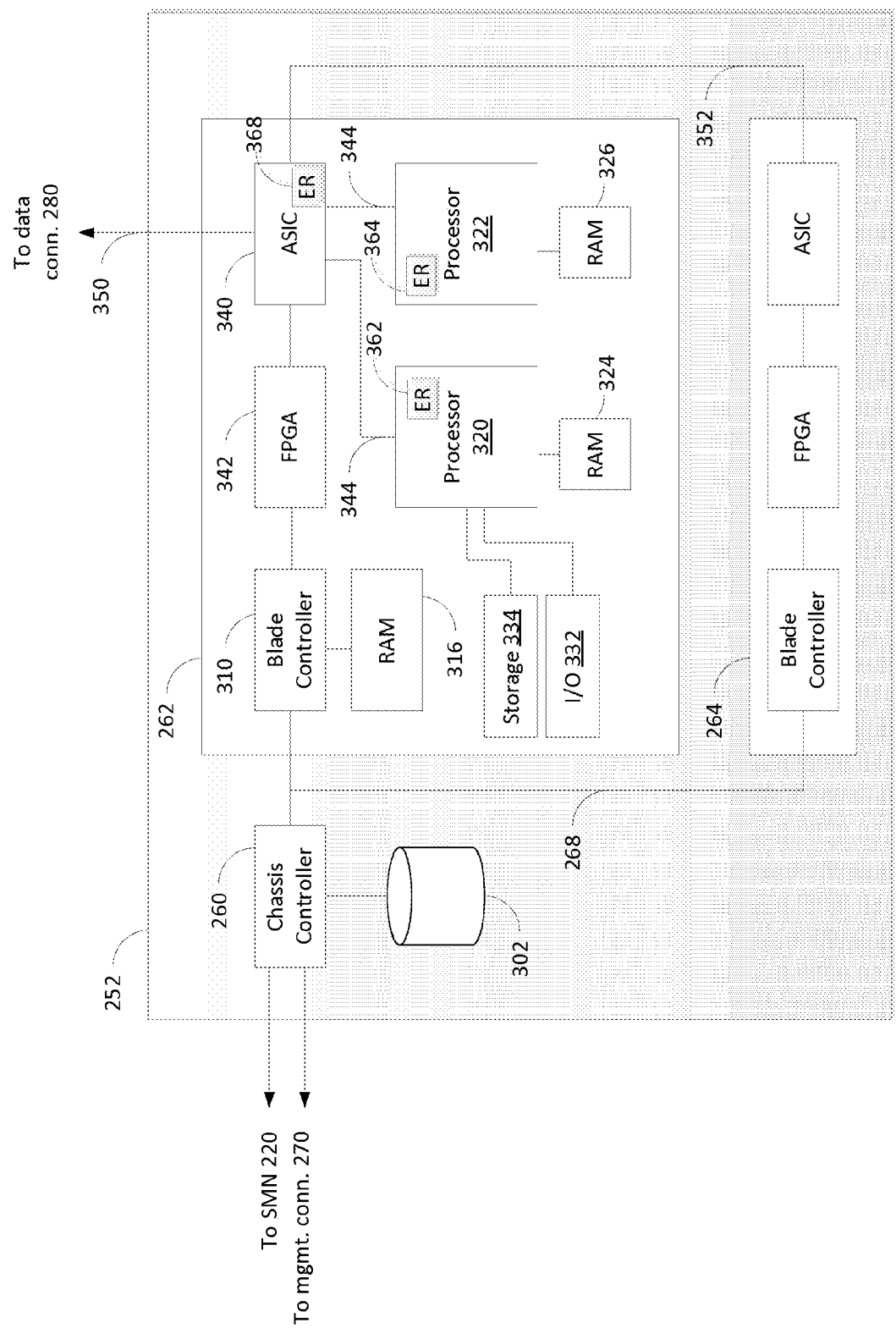
FIG. 3 schematically shows details of a blade chassis of the HPC system of FIG. 1.

FIG. 3 schematically shows a single blade chassis 252 in more detail. In this figure, parts not relevant to the immediate description have been omitted. The chassis controller 260 is shown with its connections to the system management node 220 and to the management connection 270. The chassis controller 260 may be provided with a chassis data repository 302 for storing chassis management data. In some embodiments, the chassis data repository 302 is volatile random access memory ("RAM"), in which case data in the chassis data repository 302 are accessible by the SMN 220 so long as power is applied to the blade chassis 252, even if one or more of the computing partitions has failed (e.g., due to an OS crash) or a blade has malfunctioned. In other embodiments, the chassis data repository 302 is non-volatile storage such as a hard disk drive ("HDD") or a solid state drive ("SSD"). In these embodiments, data in the chassis data repository 302 remain accessible upon rebooting even after the HPC system has been powered down.

FIG. 3 shows relevant portions of specific implementations of the blades 262 and 264 for discussion purposes. The blade 262 includes a blade management controller 310 (also called a "blade controller" or "BMC") that executes system management functions at a blade level, in a manner analogous to the functions performed by the chassis controller at the chassis level. The blade controller 310 may be implemented to permit communication with the chassis controller 260. In addition, the blade controller 310 may have its own RAM 311 to carry out its management functions. The chassis controller 260 communicates with the blade controller of each blade using the local management bus 268, as shown in FIGS. 2 and 3.

The blade 262 also includes one or more processors 320, 322 that are connected to RAM 324, 326. Blade 262 may be alternately configured so that multiple processors may access a common set of RAM on a single bus, as is known in the art. It should also be appreciated that processors 320, 322 may include any number of central processing units ("CPUs") or cores, as is known in the art. The processors 320, 322 in the blade 262 are connected to other items, such as a data bus that communicates with I/O devices 332, a data bus that communicates with non-volatile storage 334, and other buses commonly found in standalone computing systems. (For clarity, FIG. 3 shows only the connections from processor 320 to these other devices.) The processors 320, 322 may be, for example, Intel® Core™ processors manufactured by Intel Corporation. The processor chips may include any number of error registers 362, 364 for recording conditions upon detection of an error. The I/O bus may be, for example, a PCI or PCI Express ("PCIe") bus. The storage bus may be, for example, a SATA, SCSI, or Fibre Channel bus. It will be appreciated that other bus standards, processor types, and processor manufacturers may be used in a HPC that may also implement illustrative embodiments of the present invention.

Each blade (e.g., the blades 262 and 264) in a HPC includes an application-specific integrated circuit 340 (also referred to as an "ASIC", "hub chip", or "hub ASIC") that controls much of its functionality. More specifically, to logically connect the processors 320, 322, RAM 324, 326, and other devices 332, 334 together to form a managed, multi-processor, coherently-shared distributed-memory HPC system, the processors 320, 322 are electrically connected to the hub ASIC 340. The hub ASIC 340 thus provides an interface between the HPC system management functions generated by the SMN 220, chassis controller 260, and blade controller 310, and the computing resources of the blade 262. Also to assist in diagnosis, the hub chip may include any number of error registers 368 for recording conditions upon detection of an error.

In this connection, the hub ASIC 340 connects with the blade controller 310 by way of a field-programmable gate array ("FPGA") 342 or similar programmable device for passing signals between integrated circuits. In particular, signals are generated on output pins of the blade controller 310, in response to commands issued by the chassis controller 260. These signals are translated by the FPGA 342 into commands for certain input pins of the hub ASIC 340, and vice versa. For example, a "power on" signal received by the blade controller 310 from the chassis controller 260 requires, among other things, providing a "power on" voltage to a certain pin on the hub ASIC 340; the FPGA 342 facilitates this task.

The field-programmable nature of the FPGA 342 permits the interface between the blade controller 310 and ASIC 340 to be reprogrammable after manufacturing. Thus, for example, the blade controller 310 and ASIC 340 may be designed to have certain generic functions, and the FPGA 342 may be used advantageously to program the use of those functions in an application-specific way. The communications interface between the blade controller 310 and ASIC 340 also may be updated if a hardware design error is discovered in either module, permitting a quick system repair without requiring new hardware to be fabricated.

Also in connection with its role as the interface between computing resources and system management, the hub ASIC 340 is connected to the processors 320, 322 by way of a high-speed processor interconnect 344. In one embodiment, the processors 320, 322 are manufactured by Intel Corporation which provides the Intel® QuickPath Interconnect ("QPI") for this purpose, and the hub ASIC 340 includes a module for communicating with the processors 320, 322 using QPI. Other embodiments may use other processor interconnect configurations.

The hub chip 340 in each blade also provides connections to other blades for high-bandwidth, low-latency data communications. Thus, the hub chip 340 includes a link 350 to the computing connection 280 that connects different blade chassis. This link 350 may be implemented using networking cables, for example. The hub ASIC 340 also includes connections to other blades in the same blade chassis 252. The hub ASIC 340 of blade 262 connects to the hub ASIC 340 of blade 264 by way of a chassis computing connection 352. The chassis computing connection 352 may be implemented as a data bus on a backplane of the blade chassis 252 rather than using networking cables, advantageously allowing the very high speed data communication between blades that is required for high-performance computing tasks. Data communication on both the inter-chassis computing connection 280 and the intra-chassis computing connection 352 may be implemented using a NUMA protocol.

System Operation

System management commands generally propagate from the SMN 220, through the management connection 270 to the blade chassis (and their chassis controllers), then to the blades (and their blade controllers), and finally to the hub ASICS that implement the commands using the system computing hardware.

As a concrete example, consider the process of powering on an HPC system. In accordance with exemplary embodiments of the present invention, the HPC system 100 is powered when a system operator issues a "power on" command from the SMN 220. The SMN 220 propagates this command to each of the blade chassis 252-258 by way of their respective chassis controllers, such as chassis controller 260 in blade chassis 252. Each chassis controller, in turn, issues a "power on" command to each of the respective blades in its blade chassis by way of their respective blade controllers, such as blade controller 310 of blade 262. Blade controller 310 issues a "power on" command to its corresponding hub chip 340 using the FPGA 342, which provides a signal on one of the pins of the hub chip 340 that allows it to initialize. Other commands propagate similarly.

Once the HPC system is powered on, its computing resources may be divided into computing partitions. The quantity of computing resources that are allocated to each computing partition is an administrative decision. For example, a customer may have a number of projects to complete, and each project is projected to require a certain amount of computing resources. Different projects may require different proportions of processing power, memory, and I/O device usage, and different blades may have different quantities of the resources installed. The HPC system administrator takes these considerations into account when partitioning the computing resources of the HPC system 100. Partitioning the computing resources may be accomplished by programming each blade's RAM 316. For example, the SMN 220 may issue appropriate blade programming commands after reading a system configuration file.

The collective hardware computing resources of the HPC system 100 may be divided into computing partitions according to any administrative need. Thus, for example, a single computing partition may include the computing resources of some or all of the blades of one blade chassis 252, all of the blades of multiple blade chassis 252 and 254, some of the blades of one blade chassis 252 and all of the blades of blade chassis 254, all of the computing resources of the entire HPC system 100, and other similar combinations. Hardware computing resources may be partitioned statically, in which case a reboot of the entire HPC system 100 is required to reallocate hardware. Alternatively and preferentially, hardware computing resources are partitioned dynamically while the HPC system 100 is powered on. In this way, unallocated resources may be assigned to a partition without interrupting the operation of other partitions.

It should be noted that once the HPC system 100 has been appropriately partitioned, each partition may be considered to act as a standalone computing system. Thus, two or more partitions may be combined to form a logical computing group inside the HPC system 100. Such grouping may be necessary if, for example, a particular computational task is allocated more processors or memory than a single operating system can control. For example, if a single operating system can control only 64 processors, but a particular computational task requires the combined power of 256 processors, then four partitions may be allocated to the task in such a group. This grouping may be accomplished using techniques known in the art, such as installing the same software on each computing partition and providing the partitions with a VPN.

Once at least one partition has been created, the partition may be booted and its computing resources initialized. Each computing partition, such as partition 160, may be viewed logically as having a single OS 191 and a single BIOS 192. As is known in the art, a BIOS is a collection of instructions that electrically probes and initializes the available hardware to a known state so that the OS can boot, and is typically provided in a firmware chip on each physical server. However, a single logical computing partition 160 may span several blades, or even several blade chassis. A blade may be referred to as a "computing node" or simply a "node" to emphasize its allocation to a particular partition.

Booting a partition in accordance with an embodiment of the invention requires a number of modifications to be made to a blade chassis that is purchased from stock. In particular, the BIOS in each blade is modified to determine other hardware resources in the same computing partition, not just those in the same blade or blade chassis. After a boot command has been issued by the SMN 220, the hub ASIC 340 eventually provides an appropriate signal to the processor 320 to begin the boot process using BIOS instructions. The BIOS instructions, in turn, obtain partition information from the hub ASIC 340 such as: an identification (node) number in the partition, a node interconnection topology, a list of devices that are present in other nodes in the partition, a master clock signal used by all nodes in the partition, and so on. Armed with this information, the processor 320 may take whatever steps are required to initialize the blade 262, including 1) non-HPC-specific steps such as initializing I/O devices 332 and non-volatile storage 334, and 2) also HPC-specific steps such as synchronizing a local hardware clock to a master clock signal, initializing HPC-specialized hardware in a given node, managing a memory directory that includes information about which other nodes in the partition have accessed its RAM, and preparing a partition-wide physical memory map.

At this point, each physical BIOS has its own view of the partition, and all of the computing resources in each node are prepared for the OS to load. The BIOS then reads the OS image and executes it, in accordance with techniques known in the art of multiprocessor systems. The BIOS presents to the OS a view of the partition hardware as if it were all present in a single, very large computing device, even if the hardware itself is scattered among multiple blade chassis and blades. In this way, a single OS instance spreads itself across some, or preferably all, of the blade chassis and blades that are assigned to its partition. Different operating systems may be installed on the various partitions. If an OS image is not present, for example immediately after a partition is created, the OS image may be installed using processes known in the art before the partition boots.

Once the OS is safely executing, its partition may be operated as a single logical computing device. Software for carrying out desired computations may be installed to the various partitions by the HPC system operator. Users may then log into the SMN 220. Access to their respective partitions from the SMN 220 may be controlled using volume mounting and directory permissions based on login credentials, for example. The system operator may monitor the health of each partition, and take remedial steps when a hardware or software error is detected. The current state of long-running application programs may be saved to non-volatile storage, either periodically or on the command of the system operator or application user, to guard against losing work in the event of a system or application crash. The system operator or a system user may issue a command to shut down application software. Other operations of an HPC partition may be known to a person having ordinary skill in the art. When administratively required, the system operator may shut down a computing partition entirely, reallocate or deallocate computing resources in a partition, or power down the entire HPC system 100.

Error Logging

In order to facilitate locating and replacing faulty components of a hardware architecture operating a plurality of physically separate computing nodes, such as in a HPC, field replaceable unit ("FRU") analysis is conducted in a system management node separate from the computing nodes. Certain information can be gathered by the FRU analyzer by directly reading error registers using JTAG ("Joint Test Action Group"). Such reads only give the register status as of the time of the read. When errors arise in a system, they tend to happen in a burst with many errors causing other errors in quick succession. The snapshot of error register status afforded through JTAG, although useful can be greatly enhanced as taught in embodiments of the present invention. By creating a log of errors in real-time, a history of errors up to the point when the FRU analyzer is executed, can allow the historical error data and the JTAG error data to be combined in a database available for the calculations and analysis. This greater body of data allows for an analysis that can lead a skilled technician more quickly to the source of the errors or failure.

In accordance with illustrative aspects of the present invention, the BIOS operating at each computing node participates in error information gathering and reporting of the information to a system management node. In particular, the BIOS can be used to collect information on errors of the type that are non-fatal. Computer operation continues during and after collection of the error data. An exemplary process for error gathering in a computing node is set forth in FIG. 4A. When hardware in the computing node detects an error, an error interrupt is generated. Responsive to the error interrupt, an error handler is initiated 402. By using the BIOS to run the error handler, errors can be retrieved locally and quickly, therefore with less time impact on the processor. The error handler instructions are fetched from local memory. Preferably, error handling focuses on local errors to minimize the need to communicate outside the local address space, which would require higher latency I/O. The error handler reads 404 the error registers in the computing node.

The error data is written 406 by the error handler into a buffer designated for storing errors. The buffer is readily accessible to the blade controller 310 in the computing node. For example, the buffer may be memory mapped into RAM 316. To allow BIOS to do the I/O without waiting, the buffer can be organized as a ring buffer data structure. The ring buffer thus further contributes to the speed with which error data can be recorded. In specific embodiments, the RAM in which the buffer is mapped may be an SDRAM shared by the BIOS and blade controller 310 via the FPGA 342.

In order to further minimize the time spent doing I/O between BIOS and the blade controller, the size of the error data sent is advantageously minimized. This is a departure from the UEFI ("Unified Extensible Firmware Interface") standard approach typically used by operating systems when gathering error data. A standard UEFI record consists of:

```
typedef struct {
    UINT32        Signature;
    UINT16        Revision;
    UINT16        SignatureEnd0;
    UINT16        SignatureEnd1;
    UINT16        SectionCount;
    UINT32        ErrorSeverity;
    UINT32        ValidationBits;
    UINT32        RecordLength;
    UINT64        TimeStamp;
    EFI_GUID      PlatformID;
    EFI_GUID      PartitionID;
    EFI_GUID      CreatorID;
    EFI_GUID      NotificationType;
    UINT64        RecordID;
    UINT32        Flags;
    UINT64        PersistenceInfo;
    UINT64        Reserved0;
    UINT32        Reserved1;
} UEFI_RECORD_HEADER;
```

The record is 128 bytes of data. In addition, each UEFI record has any number of "section headers" describing individual errors as follows:

```
typedef struct {
    UINT32        SectionOffset;
    UINT32        SectionLength;
    UINT16        Revision;
    UINT8         ValidationBits;
    UINT8         Reserved;
    UINT32        Flags;
    EFI_GUID      SectionType;
    EFI_GUID      FRUId;
    UINT32        SectionSeverity;
    CHAR8         FRUText[UEFI_FRU_STRING_MAX_SIZE];
} UEFI_SECTION_DESCRIPTOR;
```

This is an additional 72 bytes of data. To this is normally added platform specific information. Instead of burdening the operating system with compiling UEFI records, the BIOS of an embodiment of the invention collects error data consisting essentially of error register identifiers and the contents of the error register. Error data may be packaged as register identifier/value pairs. This is the common data format also provided through the JTAG interface. For example:

| Byte | Description |
| --- | --- |
| 0-3 | register identifier |
| 4-7 | register value |

By using the same register identifier supplied in JTAG, the FRU analyzer can more easily handle both the error data received through JTAG and BIOS. The BIOS error data may be sent in packets containing multiple identifier/value pairs. A packet of ten pairs would be 80 bytes for the four byte register values illustrated above. If eight byte registers were in use, each data pair would be twelve bytes and ten such pairs in a packet would fill 120 bytes. The other information collected in a UEFI record would be provided by the blade controller 310 or the chassis controller 260. The blade controller 310 knows the time of the error because it receives an error buffer interrupt at the time the error is logged into the buffer. Other information such as thermal, power, blade IDs, and hardware configuration can also be provided by the blade controller and chassis controller. By limiting the data collected by the BIOS to no more than error register identifiers and the contents of the error registers, the burdens of error data collection on the BIOS is greatly minimized. This is important for any performance-critical system, particularly HPC's.

In the event of the buffer being full and unable to accept additional error data, the error handler write will not occur. Instead, the bits will be discarded. This loss of error data must be expected considering how errors can come in large bursts. To record every error in such situations would require intolerably slowing the system operation. Given that many of these errors will be related to one another, it is generally sufficient to gather as much error information as possible without unduly slowing the system.

After the error registers have been read, the registers are rearmed 408 to make them ready to report a next error. This completes the error handler process, which is initiated again upon another error interrupt. To further limit error collection during error bursts, a threshold of errors per time interval may be set above which rearming is curtailed. This stops further errors of that type from causing more interrupts.

When the error handler writes to the buffer, the FPGA 342 generates an interrupt. Blade controller 310 receives 420 the interrupt. Thus alerted, the blade controller reads 422 the error data from the buffer. The blade controller then writes 424 the error data to chassis level storage. In FIG. 3, the chassis level storage may be the data repository 302. The chassis controller 260 may receive hardware error data from one or more of the blades 262-266. The error data is retrieved 426 from the chassis into a system management node. In an HPC, a FRU analyzer in the system management node 220 may be responsible for retrieving the error data. An extensive log of error data can thus be stored off of the computing nodes. The error data is available for analysis 428 in a system error analyzer, such as a FRU analyzer. The log of error data is thus available even when one or more of the computing nodes has become inoperative. Moreover, the error data is available for later analysis in combination with error data stored by the other chassis controllers in the hardware architecture. In addition, the system error analyzer can also do JTAG reads of error registers. The error analyzer may institute JTAG reads even when a computer failure keeps BIOS from executing. JTAG reads may also be conducted by a chassis controller upon user command, or responsive to a lost heartbeat or other prompt. Analysis of the comprehensive error information thus made available to the error analyzer will normally help minimize the time to repair.

Booting Up the Error Handling

Figure 4A:
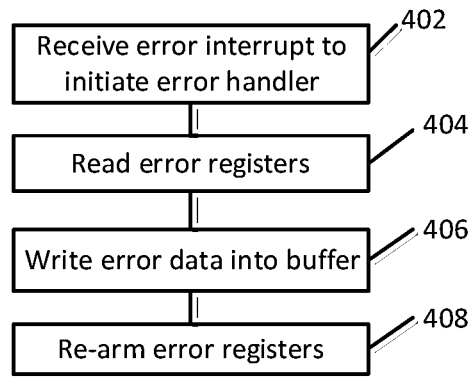
FIGS. 4A and 4B are flow charts for error handling processes in accordance with embodiments of the present invention.
Figure 4B:
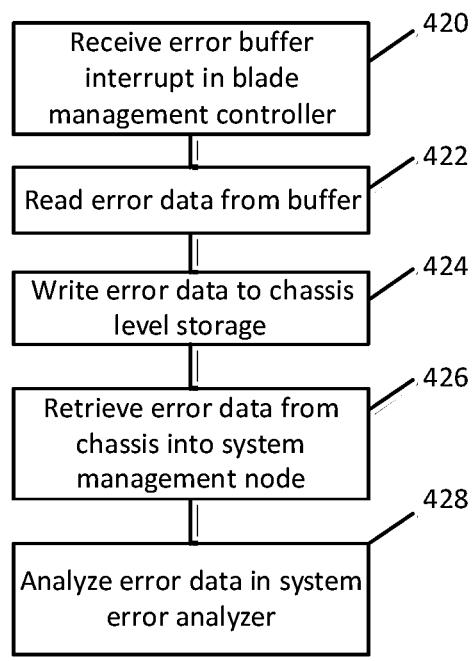

Processes shown in FIGS. 5A-D may be added to the BIOS of each blade in a hardware architecture of physically separate computing nodes in order to implement error logging into a system management node. To minimize I/O communications, it is preferred that the error reporting for each blade be handled locally. This presents an additional challenge for shared memory systems such as an HPC in which the BIOS is normally written to accommodate partitions that may include a plurality of blades. Thus the memory and resources made readily available by the BIOS may include memory and resources on other computing nodes. One aspect of error handling in accordance with illustrative embodiments of the present invention departs from the shared memory environment and provides the BIOS with knowledge of what constitutes the local registers on its own computing node. Thus, the BIOS may include the boot process of allocating 502 an area of local memory, such as the RAM 324, 326 attached to the processor socket. Whoami information, including blade and processor identifiers, and hardware configuration information is initialized 504 in the area in local memory. The hardware configuration information may include number of blades in the system, hardware revision number, memory sizes and the like. Error handler code for performing the process of FIG. 4A is copied 506 into the local memory. The error handler is registered 508 so that it will be called upon to run in response to an error interrupt.

Figure 5A:
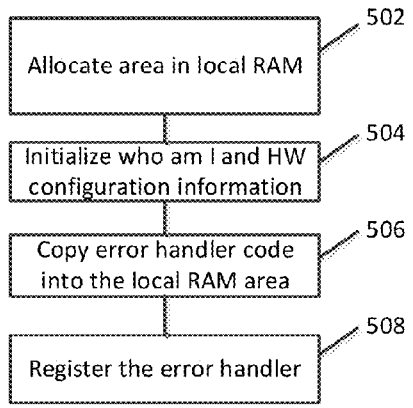
FIGS. 5A-D are flow charts for booting up a system for performing the processes of FIGS. 4A and 4B.
Figure 5D:
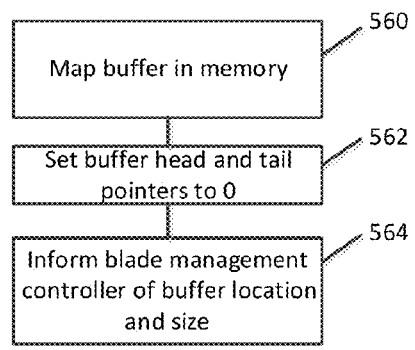
Figure 5B:
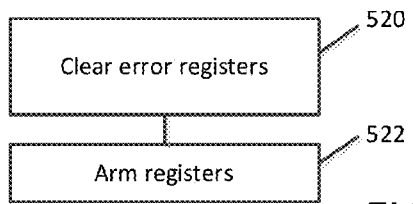

Another aspect of booting up the blade involves initializing the error registers as shown in FIG. 5B. The error registers addressed in this process would normally be those that report errors that typically do not halt computer operations. The error registers are cleared 520. The cleared registers are armed 522 so that they are ready to present error data upon detection of a designated error.

Figure 5C:
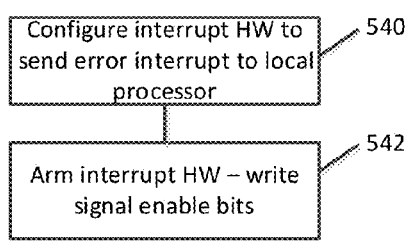

The error interrupt hardware on the blade is initialized during booting up of the blade as shown in FIG. 5C. To that end, interrupt hardware is configured 540 by the BIOS to send error interrupts to a local processor. The processor will run the registered error handler code upon receiving such an interrupt. The BIOS arms 542 the interrupt hardware, typically by writing the signal enable bits.

FIG. 5D illustrates a process for setting up a buffer to receive error data. The buffer is mapped 560 in memory, such as RAM 316, which may preferably be an SDRAM. For a ring buffer, the buffer head and tail pointers are set 562 to zero. Having set up the buffer to receive error data, the blade controller is then informed 564 of the buffer location and size so that error data may be removed from the buffer.

Hardware Architecture of Physically Separate Computing Nodes with Error Logging

Error logging in a system management node distinct from the computing nodes can have a beneficial impact on time to repair for the overall hardware architecture. In accordance with illustrative embodiments of the present invention, the BIOS of each computing node participates in the error collection and logging. Each of a plurality of computing nodes has a BIOS, at least one error register and at least one processor. In the example of an HPC, each blade 262-264 constitutes a computing node. The BIOS of each computing node instructs a processor in the computing node to read error data from one or more error registers in the node and writes the error data into a buffer. The buffer may be without limitation an area in memory configured to act as a buffer or a dedicated hardware buffer or other means for performing the functions of a buffer. In the HPC example described herein, the BIOS registered error handler code and configured a ring buffer in RAM for these purposes. A management controller at each computing node extracts the error data logged into the buffer. The management controller is hardware distinct from the hardware running the operating system of the computing node. In the HPC example, the management controller is blade controller 310 and the processors 320, 322 run the operating system. By separating the error collection function from the operating system, error data extracted by the management controller in each computing node can be collected by a system management node independently of the functioning of the operating system. In the HPC example, the extracted error data is collected in a system management node 220 physically separate from the chassis housing the blades. While an HPC system is described in detail herein, embodiments of the present invention may also be implemented in other hardware architectures of physically separate computing nodes such as cluster architectures.

Program Code

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium.

The medium may be either a tangible medium (e.g., optical or analog communications lines) or a medium implemented with wireless techniques (e.g., WIFI, microwave, infrared or other transmission techniques). The series of computer instructions can embody all or part of the functionality previously described herein with respect to the system. The processes of FIGS. 4A-4B and FIGS. 5A-5D are exemplary and may include various alternatives, equivalents, or derivations thereof including but not limited to the order of execution of the same.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computing system comprising:
a system management node;
a plurality of computing nodes, each computing node having a BIOS (Basic Input/Output System) and at least one processor chip having an error register and a processor;
a management controller at each computing node;
at least one buffer at each computing node, wherein the management controller of a respective computing node that includes the at least one buffer is configured to extract error data from the at least one buffer without accessing through the at least one processor chip of the respective computing node;
wherein the BIOS of each computing node is configured to instruct the processor of the at least one processor chip to read error data from its error register and write the error data into the at least one buffer of the respective computing node; and
wherein the system management node is configured to receive the error data from each of the management controllers.

2. The computing system of claim 1, wherein each computing node includes a hub chip for tightly coupling the plurality of computing nodes and supporting access to shared memory among the computing nodes.

3. The computing system of claim 1, further comprising a plurality of chassis each containing at least two of the plurality of computing nodes.

4. The computing system of claim 3, wherein each chassis includes a chassis controller in communication with the management controllers in each of the computing nodes in the chassis.

5. The computing system of claim 1, wherein the system management node is coupled to a chassis controller and receives the error data from the management controller of the respective computing node through the chassis controller.

6. The computing system of claim 1, wherein each of the at least one buffers includes a memory mapped buffer.

7. The computing system of claim 6, wherein the memory mapped buffer includes a ring buffer.

8. The computing system of claim 1, wherein the system management node directly reads error registers using JTAG ("Joint Test Action Group") and wherein error data obtained through JTAG and error data from the management controllers are combined into a database for analysis.

9. A computing node comprising:
at least one processor chip including at least one error register and at least one processor, having a BIOS (Basic Input/Output System) and an operating system;
a memory mapped buffer, wherein the BIOS is configured to instruct the at least one processor to read error data from at least one of the at least one error register and write the error data into the memory mapped buffer;
a management controller configured to extract error data from the memory mapped buffer without accessing through the at least one processor chip; and
a hub chip configured to support access to shared memory with other computing nodes.

10. The computing node of claim 9, wherein the error data written into the memory mapped buffer consists essentially of error register identifiers and contents of the at least one error register.

11. The computing node of claim 9, wherein the memory mapped buffer includes a ring buffer.

12. The computing node of claim 9, further comprising a programmed gate array for generating an interrupt when error data is written into the memory mapped buffer.

13. The computing node of claim 9, wherein the BIOS is configured to instruct the processor of the at least one processor chip to rearm at least one of the at least one error register.

14. The computing node of claim 9, further comprising one or more error registers located on the hub chip.

15. A method of booting up a computing node in a shared memory architecture operating a plurality of computing nodes, the method comprising:
 allocating an area in local memory of a processor in the computing node, for maintaining local hardware configuration information;
 memory mapping a buffer in a memory, the memory being separate from the local memory of the processor and being accessible to a controller in the computing node without accessing through the processor, and informing the controller of the location of the buffer;
 copying error handler code to the local memory, wherein the error handler code includes an instruction to read an error register and to write error data from the error register to the buffer; and
 configuring interrupt hardware to trigger running of the error handler code.

16. The method of claim 15, wherein the buffer is mapped into a synchronous dynamic random-access memory.

17. The method of claim 15, wherein the error data consists essentially of error register identifiers and contents of the error register.

18. The method of claim 15, wherein the error handler code further includes an instruction to rearm the error register after the error register has been read.

* * * * *